(12) United States Patent
Lunby et al.

(10) Patent No.: US 6,393,010 B1
(45) Date of Patent: May 21, 2002

(54) TIME OFFSET TECHNIQUE FOR INCREASING THE CAPACITY OF A CDMA SYSTEM

(75) Inventors: Stein A. Lunby; Edward G. Tiedemann, Jr.; Jack M. Holtzman; Daisuke Terasawa, all of San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/136,699

(22) Filed: Aug. 19, 1998

(51) Int. Cl.$^7$ .......................... H04B 7/216; H04J 13/00
(52) U.S. Cl. ..................... 370/342; 370/491; 370/479; 375/144; 375/146; 455/522
(58) Field of Search ................................ 370/320, 335, 370/342, 347, 441, 479; 455/522, 500, 501, 507, 509; 375/140, 141, 144, 146

(56) References Cited

U.S. PATENT DOCUMENTS

| | | | | |
|---|---|---|---|---|
| 5,799,013 A | * | 8/1998 | Seshadri et al. | 370/342 |
| 5,930,248 A | * | 7/1999 | Langlet et al. | 370/347 |
| 5,974,315 A | * | 10/1999 | Hudson | 455/427 |
| 6,301,289 B1 | * | 10/2001 | Bejjani et al. | 375/144 |
| 6,317,435 B1 | * | 11/2001 | Tiedmann, Jr. et al. | 370/441 |

FOREIGN PATENT DOCUMENTS

| EP | 0795969 | 9/1997 |
|---|---|---|
| EP | 0851601 | 7/1998 |
| WO | 9818217 | 4/1998 |

* cited by examiner

Primary Examiner—Seema S. Rao
(74) Attorney, Agent, or Firm—Philip Wadsworth; Kent D. Baker; S. Hossain Beladi

(57) ABSTRACT

A method for limiting the peak transmit power in a CDMA communication system including the steps transmitting a first communication signal having a first high transmit power region and transmitting a second communication signal having a second high transmit power region. One of the first and second communication signals is time offset to prevent the first and second high transmit power regions from occurring simultaneously. Time shifting only a portion of one of the first and second communications signals is also taught. The first and second communication signals can also include respective first and second low transmit power regions. The time offset can be selected to align one of the first and second high transmit power regions with one of the first and second low transmit power regions. The total transmit power signal can be determined and the time offset can be selected according to the total transmit power signal to minimize a peak level of the total transmit power signal. Determining the total transmit power signal for a plurality of differing time offsets and selecting one of the time offsets according to the total transmit power signal is also taught. A fixed time offset or a randomly selected offset between the communication signals can be provided.

16 Claims, 6 Drawing Sheets

TIME OFFSET TECHNIQUE FOR INCREASING THE CAPACITY OF A CDMA SYSTEM

BACKGROUND OF THE INVENTION

I. Field of the Invention

The present invention relates to communication systems in general and, in particular, to improving the transmission of information signals in a communications system.

II. Description of the Related Art

CDMA communication systems are very sensitive to peak transmit power and are generally limited by interference related to transmit power levels. One interference related limitation is the so called "Near-Far Problem". In this problem as transmit power increases during a transmission it causes more interference in other channels. To deal with this additional interference the other channels must increase their own transmit power. The increase in transmit power by the other channels in turn generates more interference for all the channels. This avalanche effect occurs until the system is stabilized and all the channels are satisfied. Therefore, in order to maximize the capacity of such a system it is desirable that each user transmit only the minimum power necessary to achieve a required quality of service. Another problem that can degrade the performance of other links in a transmission system is a waveform that contains a discontinuous power pattern. This problem compounds the Near-Far Problem.

Transmit power amplifiers provide another area where interference can limit the capacity of CDMA communication systems. The maximum output power of transmit power amplifiers is determined by a number of design parameters including power dissipation and unwanted emissions. Unwanted emissions are those that are outside the bandwidth of the input signal. Most of the unwanted emissions occur due to intermodulation within the power amplifier. Intermodulation is caused by high transmit power levels that drive the amplifier into a nonlinear region.

Unwanted emissions are often limited by regulatory bodies, such as the FCC. Industry standards may also set limits on unwanted emissions in order to avoid interference with the same or another system. To maintain unwanted emissions within the desired limits, the output power of the transmit power amplifier is selected so that the probability of exceeding the emission limits is very small. When a waveform having a nonlinear envelope is amplified, the maximum output is determined by the portion of the waveform that has the highest power level. Additionally, if the requested output power exceeds the maximum permitted output power, a transmitter can limit the output power to the maximum permitted level in order to keep the unwanted emissions within the prescribed limits.

Referring now to FIG. 1, there is shown graphical representation 10 of transmission waveforms 12, 18. Transmission waveform 12 is formed of waveform portions 14, 16 having differing power levels. The transmit power level limitation of the amplifier is reached by portion 14 rather than by portion 16 because portion 14 has the highest instantaneous power. In contrast, transmission waveform 18 has a constant envelope. Transmitting at the maximum power permits higher energy transmission, as illustrated by the areas under transmission waveforms 12, 18. In order to maximize the total transmit energy over a period of time it is therefore desirable that the signal applied to the transmitter have a peak to average power ratio as close to one as possible. Furthermore, in addition to preventing the peak transmit power problems, a constant power level reduces self interference that can result from fast changes of the loading in the power amplifier.

For example, FIG. 2 shows a plurality of transmission waveforms 20a–n. The number n of number n of transmission waveforms 20a–n can be very large. For example, n can commonly have a value of two hundred or more in CDMA communication systems. Transmission signal 20a–n is formed of pilot portions 22, control portions 24, voice portions 26, and data portions 28. Pilot portions 22 of transmission signals 20a–n always have a high power level. By definition, in order to serve as a pilot signal, portion portions 22 must always be high. Data portions 28 are usually relatively high because it is a very highly utilized time slot. Voice portions 26, on the other hand, are typically low because voice signals have many unused periods. Total power waveform 30 represents the total power of transmission waveforms 20a–n summed together. Because pilot portions 22 and data portions 28 are at high levels within transmission waveforms 20a–n, the corresponding portions 32, 36 of total power waveform 30 are high. Because voice portions 26 vary and are usually low, portion 34 of total power waveform 30 can vary from close to zero to an intermediate level 34.

SUMMARY OF THE INVENTION

The invention is a method for limiting the peak transmit power in a CDMA communication system including the steps transmitting a first communication signal having a first high transmit power region and transmitting a second communication signal having a second high transmit power region. One of the first and second communication signals is time offset to prevent the first and second high transmit power regions from occurring simultaneously. Time shifting only a portion of one of the first and second communications signals is also taught. The first and second communication signals can also include respective first and second low transmit power regions. The time offset can be selected to align one of the first and second high transmit power regions with one of the first and second low transmit power regions. The total transmit power signal can be determined and the time offset can be selected according to the total transmit power signal to minimize a peak level of the total transmit power signal. Determining the total transmit power signal for a plurality of differing time offsets and selecting one of the time offsets according to the total transmit power signal id also taught. A fixed time offset or a randomly selected offset between the communication signals can be provided.

BRIEF DESCRIPTION OF THE DRAWINGS

The features, objects, and advantages of the present invention will become more apparent form the detailed description set forth below when taken in conjunction with the drawings in which like reference characters identify corresponding elements throughout and wherein.

DETAILED DESCRIPTION OF THE INVENTION

Figure 1:
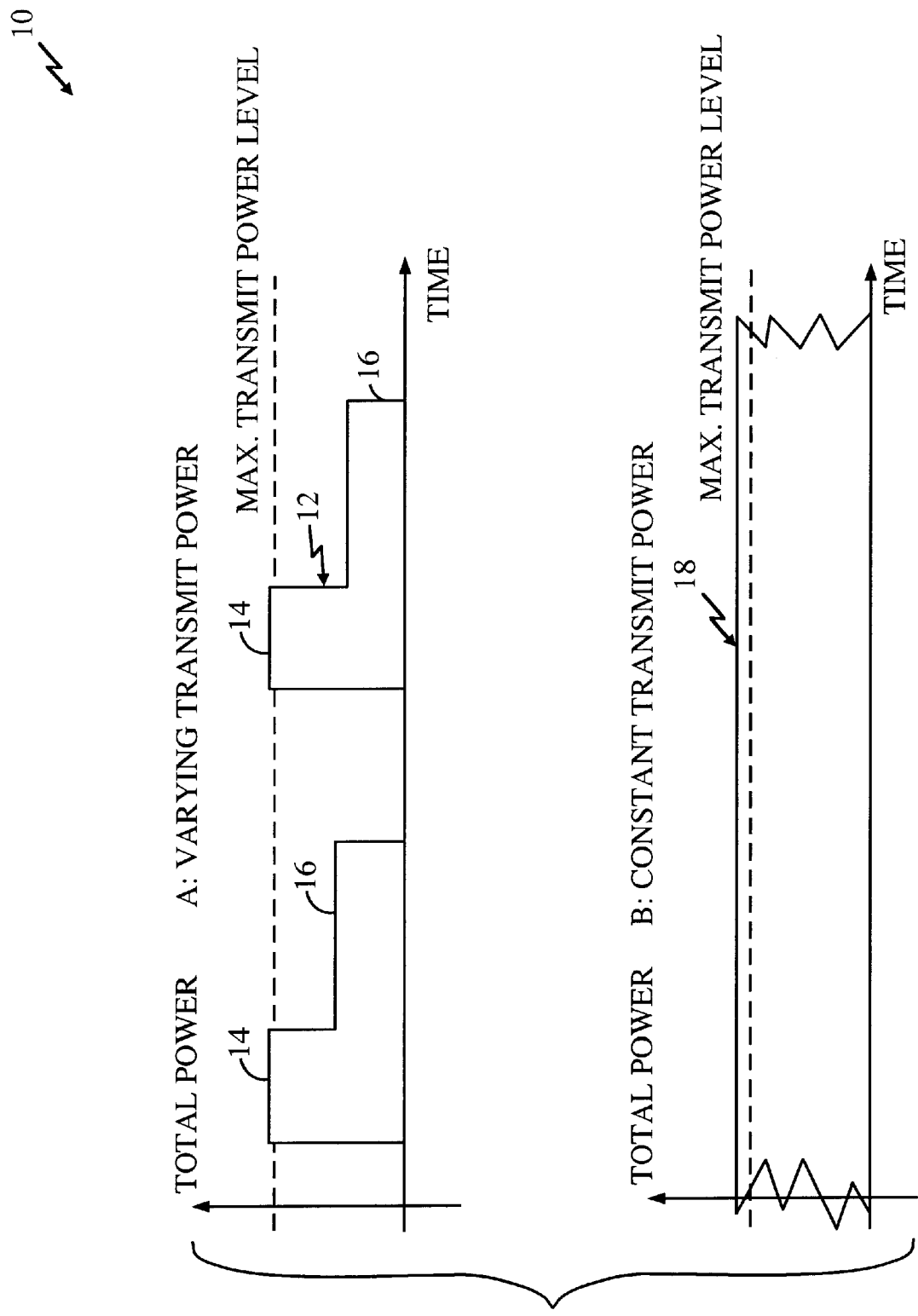
FIG. 1 shows a graphical representation of transmission waveforms.
Figure 2:
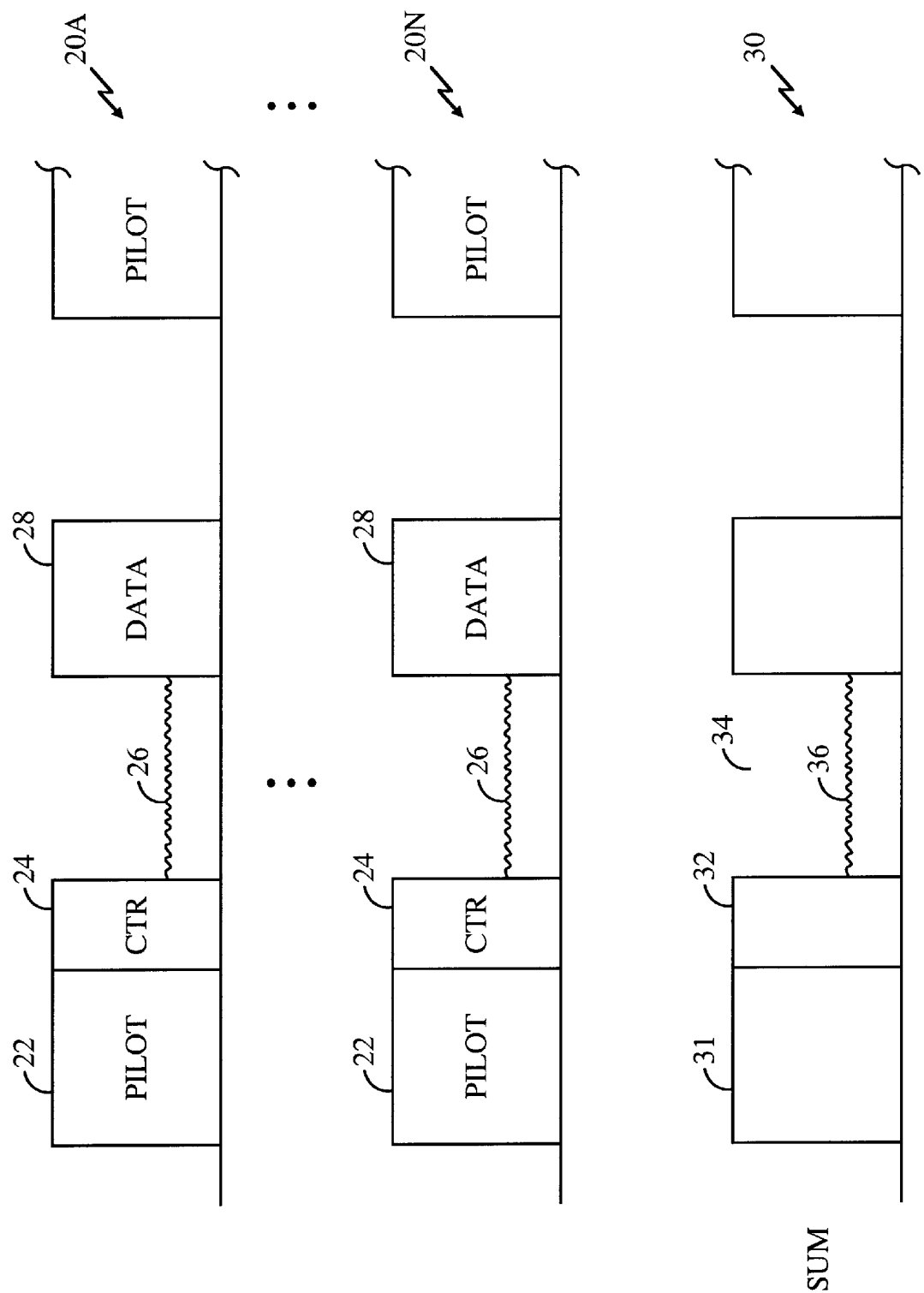
FIG. 2 shows a plurality of transmission signals in a communication system.
Figure 3:
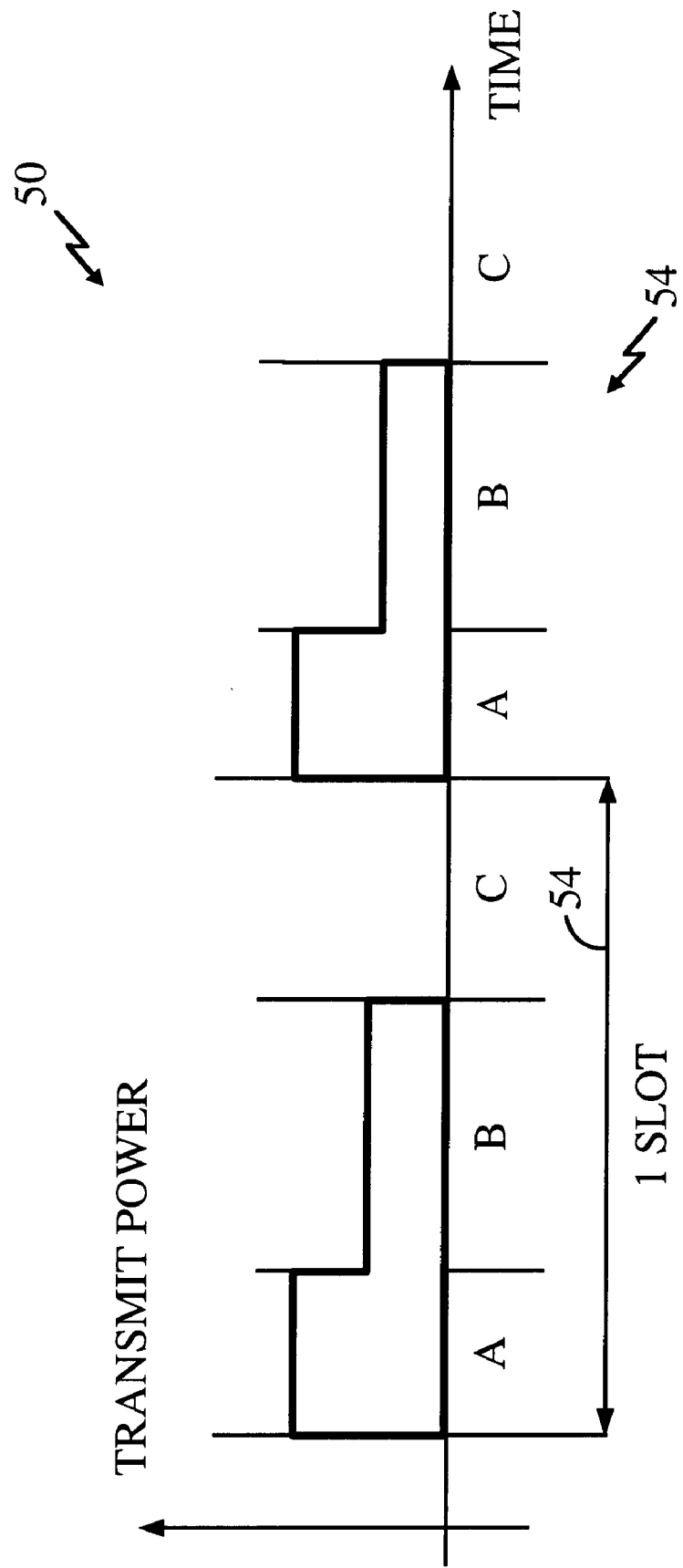
FIG. 3 shows a graphical representation of a transmission waveform.

Referring now to FIG. 3, there is shown a graphical representation of transmit waveform 50. A large number of waveforms such as transmit waveform 50 are conventionally transmitted simultaneously in CDMA communication systems. Transmit waveforms 50 are formed of a plurality of slots 54. Within each slot 54 are three regions having power levels A, B, and C. If a number of transmit waveforms 50 are transmitted through a communication band in such a way that power levels A of the various waveforms 50 occur simultaneously, the total power transmitted through the band reaches a peak at that time. Likewise, if transmit waveforms 50 are transmitted such that power levels C occur simultaneously, the total power of the band reaches a low level at that time.

However, in a preferred embodiment of the present invention transmit waveforms 50 are time offset with respect to each other in such a way that the high power levels A do not line up with each other. In this way the high levels and the low levels of the various transmit waveforms 50 are averaged out. This results, most importantly, in a lower peak transmit power in the communication band. As previously described, a lower peak transmit power reduces unwanted emissions and interference.

Figure 4:
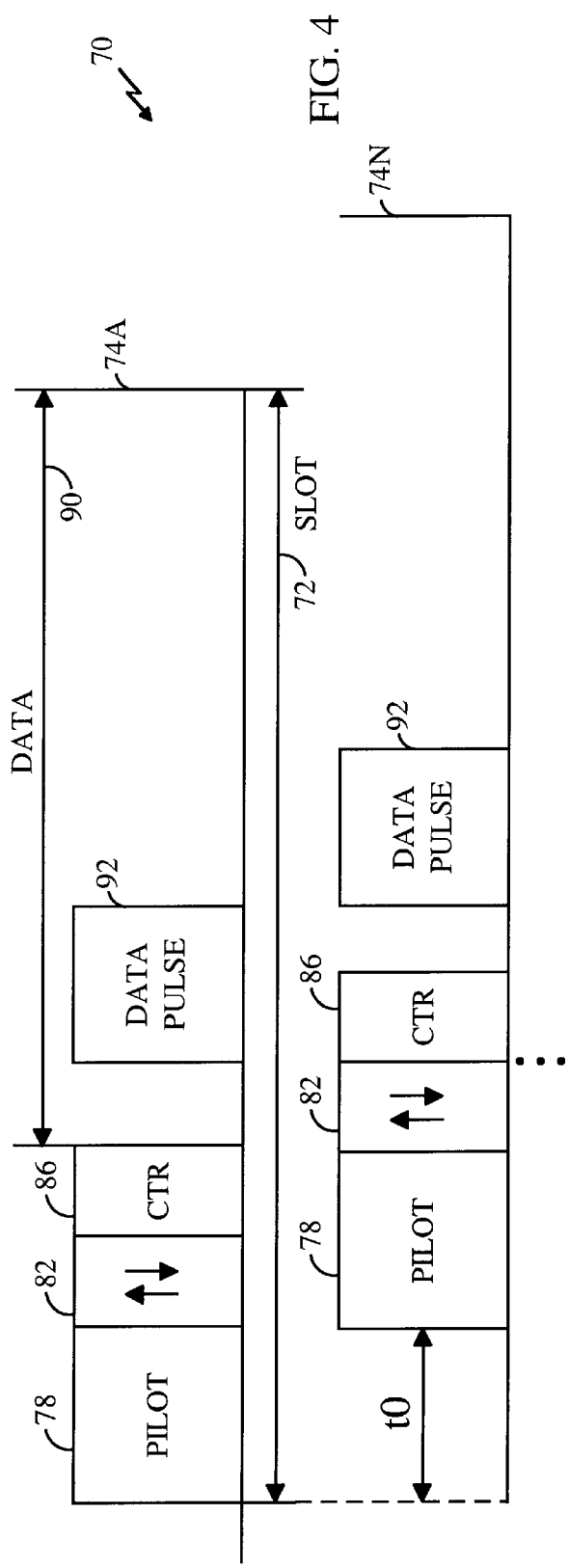
FIG. 4 shows a graphical representation of transmission waveforms.

Referring now to FIG. 4, there is shown graphical representation 70 of transmit waveforms 74a–n. Transmit waveforms 74a–n can include pilot portions 78, power up/down portions 82, control portions 86, and data portion 90 within each time slot 72. Data portions 90 contain data pulse 92. The peak transmit power of a band carrying transmit waveforms 74a–n is the sum of the power of each waveform 74a–n. Thus, in order to minimize the peak transmit power, and to thereby minimize unwanted emissions, the sum of transmit waveforms 74a–n can be averaged and smoothed.

In one preferred embodiment of the invention, the averaging of the high transmit levels A of transmit waveforms 74a–n is accomplished by providing each successive waveform 74a–n with the same fixed offset when a new waveform 74a–n is added to the communication band. Thus, for illustrative purposes, transmit waveforms 74a–n are identical to each other except that they are time offset from each other by differing multiples of the fixed time offset to.

For example, if transmit waveform 74a is the first signal to be transmitted by a communication band, it can be transmitted with zero offset. If transmit waveform 74b is the next signal to be transmitted within the communication band it can receive time offset $t_0$ with respect to transmit waveform 74a. If transmit waveform 74c is the next signal to be transmitted it can be time offset by $t_0$ with respect to transmit waveform 74b. This is equivalent to a time offset of $2t_0$ from waveform 74a. Each subsequent transmit waveform 74a–n to be transmitted by way of the communication band can then receive an additional offset $t_0$ in the same manner. It will be understood however that it is not always possible to shift every waveform by any time offset that may be required by this method.

Figure 5:
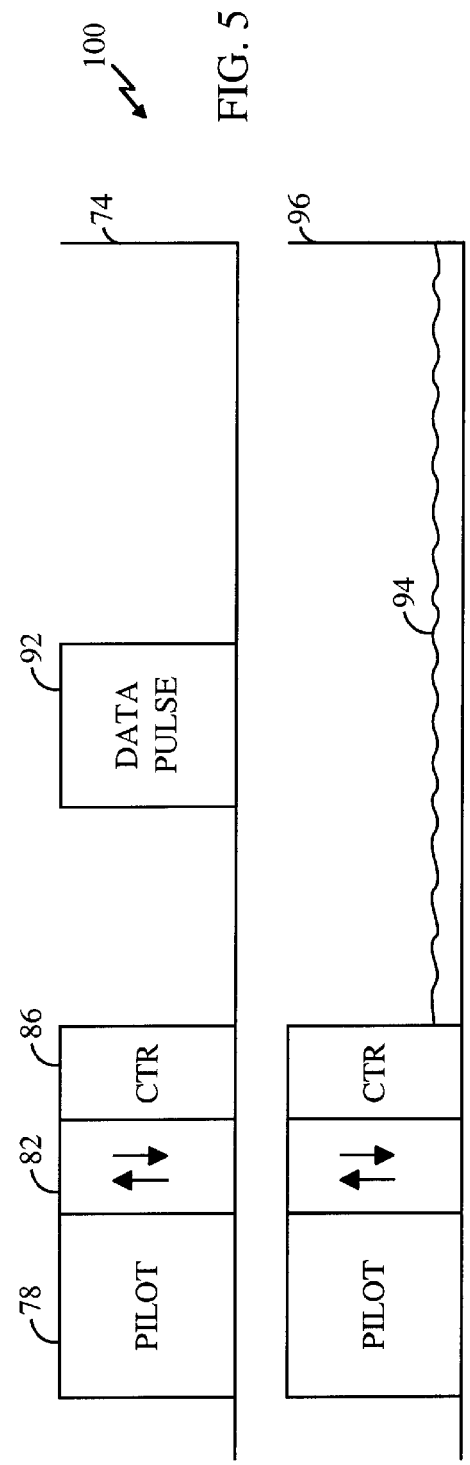
FIG. 5 shows a graphical representation of transmission waveforms.

Referring now to FIG. 5, there is shown graphical representation 100 including transmit waveform 74 and total transmit power waveform 96. When practicing the method of the present invention, further averaging of transmit waveforms 74a–n, and therefore further improvement in the peak transmit power, can be obtained by smoothing data pulse 92 within data portion 90 of waveforms 74a–n prior to applying time offsets. In order to obtain this further improvement, conventional techniques for distributing the information of data pulse 92 throughout data portion 90 can be used. Additionally, the position of data pulse 92 within data portion 90 can be varied in order to minimize the peak transmit power. Using these methods a transmit power level 94 can result within in total transmit power waveform 96.

In another embodiment of the present invention, the various portions within time slots 72 of transmit waveforms 74a–n can be separated from each other and transmitted in any of the possible sequences. For example, within time slot 72 data portion 90 can be separated from the remainder of transmit waveform 74a and transmitted first. Pilot portion 78 can be separated and transmitted next after data portion 90. The remaining portions within time slot 72 can also be transmitted in any sequence. Applying this technique to the waveform of graphical representation 50, portions A, B, and C can be transmitted as ABC, ACB, or in any other order. Furthermore, the sequences can be varied from one transmit waveform 74a–n to the next.

Improved results can be obtained in the method of separating and reordering the portions of transmit waveforms 74a–n by randomly changing the sequence of the transmissions of the waveform portions. This results in further averaging and smoothing of the contributions to the total transmit power made by the various waveforms. New transmission sequences can be continuously produced by a random number generator. In this case both the transmitter and the receiver must have knowledge of the parameters of the random number generator in order to permit decoding by the receiver.

In addition to using a fixed time offset $t_0$ for each new waveform, it is possible to select an individual offset for each new waveform according to an algorithm. For example, the new time offset can be selected by determining which of the possible offsets is being used by the lowest number of existing calls. Additionally, the individual offsets can be determined by a peak power algorithm adapted to provide a minimum increase in the peak transmit power according to the shape or expected shape of the new transmission signals. The algorithm can be a heuristic one. In order to perform this function the peak power minimization algorithm must be able to predict the transmit power waveform over a period of time, for example over a transmit frame.

Figure 6:
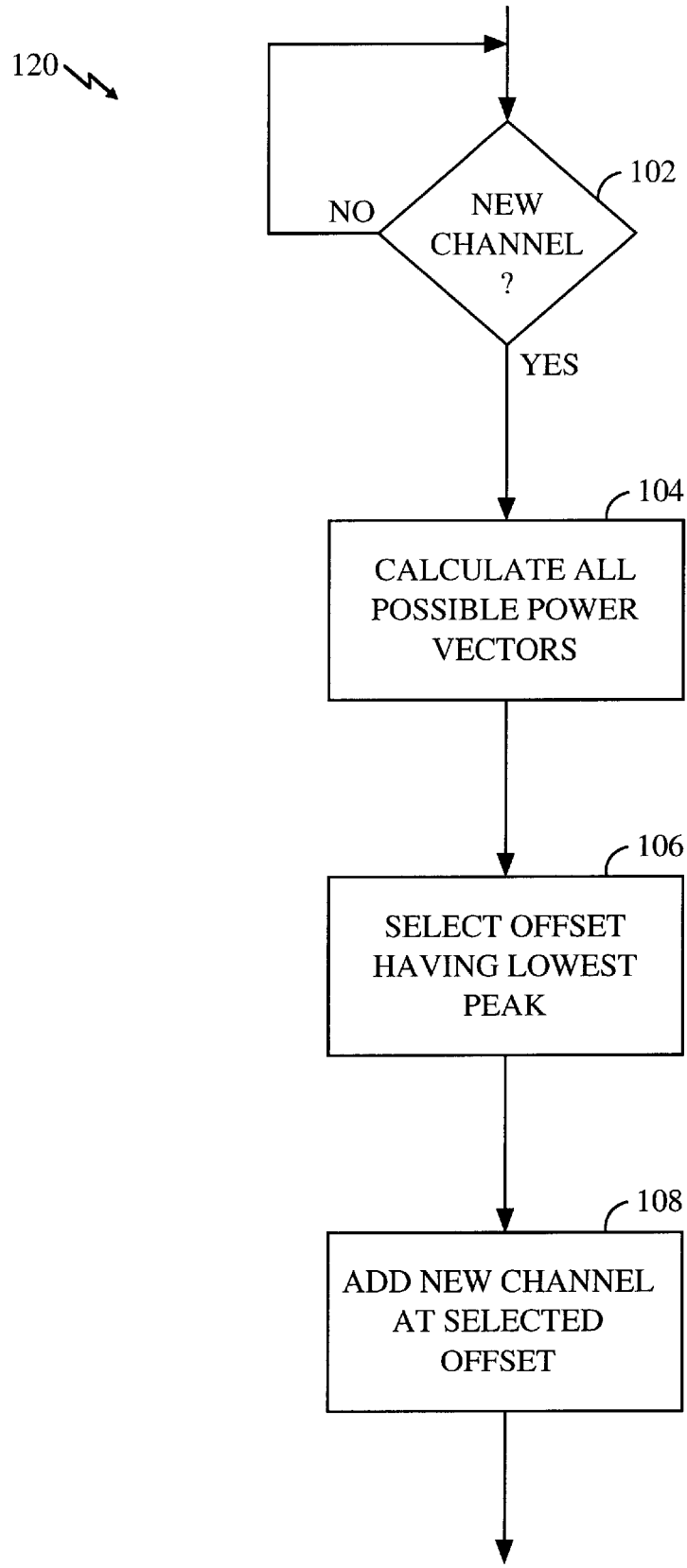
FIG. 6 shows a flowchart representation of an algorithm for predicting the peak transmit power level in a CDMA system.

Referring now to FIG. 6, there is shown transmit power prediction algorithm 120. Transmit power prediction algorithm 120 can be used to predict the new total power resulting from the addition of, for example, each transmission waveform 74a–n to a communication system. Additionally, algorithm 120 can be used to predict a new total power for adding a transmission waveform 74a–c at each of a number of possible time offsets. Thus, it is possible to select the optimum time offset resulting in the minimum increase in peak transmit power. By determining the optimum time offset for each new transmit waveform 74a–n as it is added to the communication system in this manner further improvement in system performance is obtained in an heuristic manner.

For example, the total transmit power of some known systems can be calculated as:

$$\bar{P}_n = \alpha \bar{P}_{n-1} + (1-\alpha) \bar{e}_n$$

where:

$$(1-\alpha)<1$$

is the forgetting factor, $\overline{P}_n$ is the vector with the frame power estimate at time n with elements $\overline{P}_n{}'$ corresponding to the estimated power during the ith symbol in the frame, and $\overline{e}_n$ is the vector containing the measured power for a frame at time n.

When a new channel set up is required in order to add a new transmission waveform, the base station can compute the transmit power waveform W resulting from the addition of the new channel. The base station can then compute the resulting power vectors corresponding to each of the possible time offsets as follows:

$$(\overline{P}_n{}')_{(k)}=\overline{P}_n+\text{cycl}_k(W)$$

where cyclk( ) is an operator that produces a cyclic shift of the vector W by k elements. The new channel can then be set up with the time offset that corresponds to the $(\overline{P}_n{}')_{(k)}$ having the peak power to average power ratio closest to one.

It will be understood that when a waveform such as transmission waveform 50 is separated into sections having power levels A, B and C, the transmission sequence of the sections can be selected in a similar heuristic manner. For example, the resulting peak transmit power can be determined for each possible transmission sequence and the transmission sequence resulting in the lowest peak transmit power can be selected.

Figure 7:
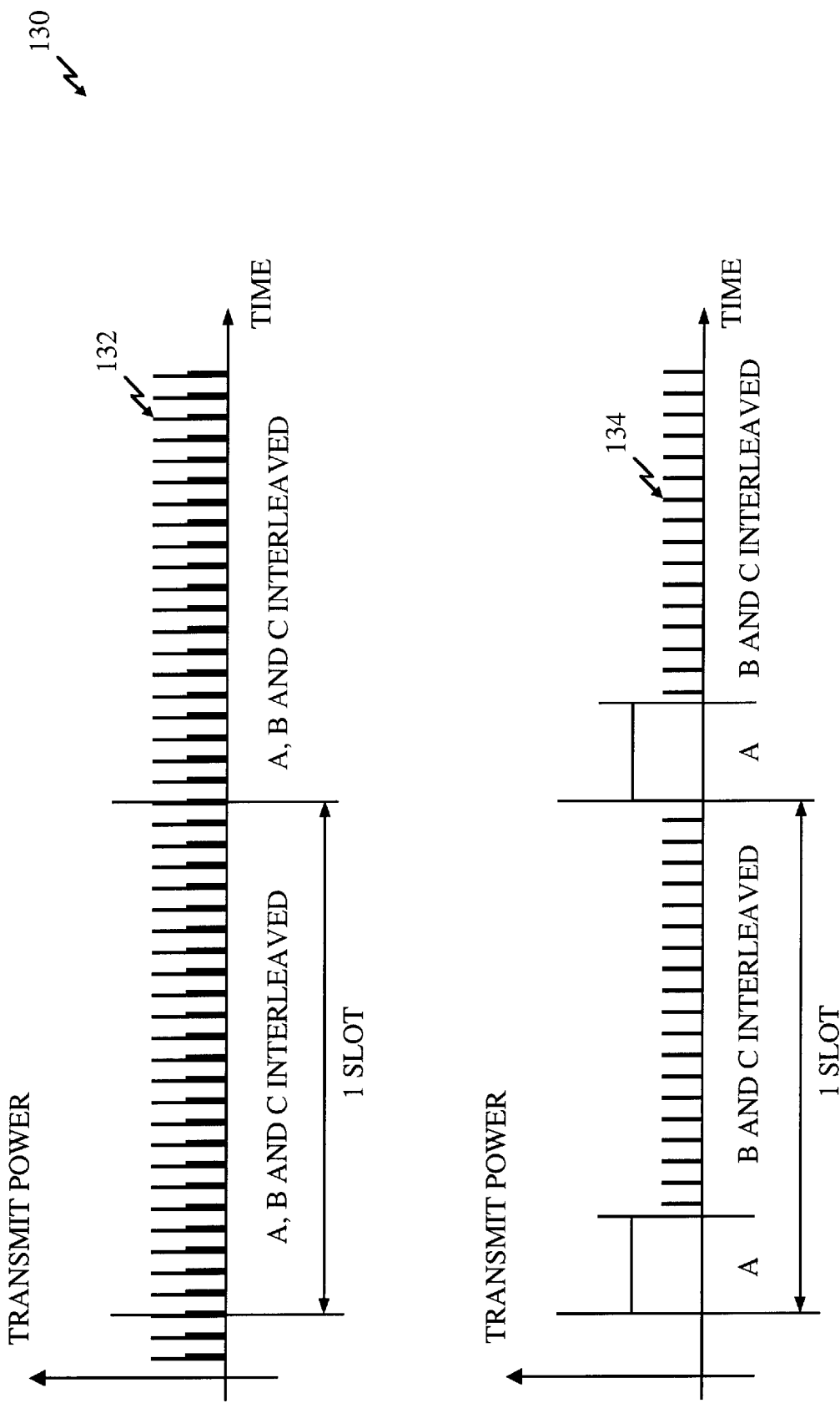
FIG. 7 shows a graphical representation of a transmission waveform interleaved according to the method of the present invention.

Referring now to FIG. 7, there is shown graphical representation 130 of transmit power waveform 132. It is understood by those skilled in the art that each region A, B and C of representation 50 can be separated into subregions. The subregions of each region can be as small as desired, with subregions having a single symbol being permitted. The subregions formed in this manner can then be interleaved with respect to each other in order to form transmit power waveform 132. Additionally, one region of the transmission waveform can be left intact while the remaining regions can be interleaved. This is set forth as transmit power waveform 134.

The order of the transmission of the interleaved subregions can be a predetermined order, a random order, or any other order understood by those skilled in the art. Separation and interleaving of transmission waveforms in this manner provides excellent averaging of transmission waveforms and minimizing of peak transmit power. When regions within a transmit power waveform are interleaved in this manner the receiver must wait for the end of a slot before. The previous description of the preferred embodiments is provided to enable a person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed. It will be understood that all of the methods disclosed herein can be used at the time of call set up or at any time during a transmission after set up.

Additionally, it will be understood that the various methods can be combined with each other in any manner. In particular, all of the separable waveform methods can be used independently or in conjunction with the previously described time shifting based methods, with or without the random or heuristic methods. Furthermore, the various methods disclosed herein can be performed either at the time of call setup or at any time during transmission of the transmission waveforms.

What is claimed is:

1. A method for limiting peak transmit power in a CDMA communication system, comprising the steps of:
    (a) transmitting a first communication signal having a first high transmit power region;
    (b) transmitting a second communication signal having a second high transmit power region; and
    (c) time offsetting one of the first and second communication signals to prevent the first and second high transmit power regions from occurring simultaneously; summing the power of the first and second communication signals to provide a total transmit power signal, wherein the first and second communication signals include respective first and second low transmit power regions, wherein the step of time offsetting comprises the step of selecting the time offset to align one of the first and second high transmit power regions with one of the first and second low transmit power regions.

2. The method for limiting peak transmit power of claim 1, wherein step © comprises time offsetting only a portion of one of the first and second communications signals.

3. The method for limiting peak transmit power of claim 2, wherein the shifted portion comprises one of the first and second high transmit power regions.

4. The method for limiting peak transmit power of claim 1, comprising the step of selecting the time offset according to the total transmit power signal.

5. The method for limiting peak transmit power of claim 4, comprising the step of selecting a time offset to minimize a peak level of the total transmit power signal.

6. The method for limiting peak transmit power of claim 4, comprising the step of determining the total transmit power signal for a plurality of differing time offsets and selecting one of the time offsets according to the total transmit power signal.

7. The method for limiting peak transmit power of claim 1, wherein the high transmit power region of one of the first and second communication signals is a pilot signal region.

8. The method for limiting peak transmit power of claim 1, comprising the step of transmitting more that two communication signals and step © includes applying a fixed time offset between all of the communication signals.

9. The method for limiting peak transmit power of claim 1, comprising the step of separating at least one of the first and second high transmit power regions into a plurality of high transmit power subregions.

10. The method for limiting peak transmit power of claim 9, comprising the step of time offsetting the high transmit power subregions by time offsets of differing durations.

11. The method for limiting peak transmit power of claim 10, wherein the differing durations are randomly selected.

12. The method for limiting peak transmit power of claim 10, wherein the first and second communication signals include respective first and second low transmit power regions, comprising the step of separating at least one of the first and second low transmit power regions into a plurality of low transmit power subregions.

13. The method for limiting peak transmit power of claim 12, comprising the step of time offsetting the low transmit power subregions of the plurality of low transmit power subregions by time offsets of differing durations.

14. The method for limiting peak transmit power of claim 13, wherein the differing low subregion durations are randomly selected.

15. A system for limiting peak transmit power in a CDMA communication system, comprising:

(a) a first transmitted communication signal having a first high transmit power region;

(b) a second transmitted communication signal having a second high transmit power region; and (c) a time offset applied to one of the first and second communication signals to prevent the first and second high transmit power regions from occurring simultaneously; summing the power of the first and second communication signals to provide a total transmit power signal, wherein the first and second communication signals include respective first and second low transmit power regions, wherein the step of time offsetting comprises the step of selecting the time offset to align one of the first and second high transmit power regions with one of the first and second low transmit power regions.

16. A system for limiting peak transmit power in a CDMA communication system, comprising:

(a) means for transmitting a first communication signal having a first high transmit power region;

(b) means for transmitting a second communication signal having a second high transmit power region; and (c) means for time offsetting one of the first and second communication signals to prevent the first and second high transmit power regions from occurring simultaneously; summing the power of the first and second communication signals to provide a total transmit power signal, wherein the first and second communication signals include respective first and second low transmit power regions, wherein the step of time offsetting comprises the step of selecting the time offset to align one of the first and second high transmit power regions with one of the first and second low transmit power regions.

* * * * *

UNITED STATES PATENT AND TRADEMARK OFFICE
CERTIFICATE OF CORRECTION

PATENT NO.    : 6,393,010 B1
DATED         : May 21, 2002
INVENTOR(S)   : Stein A. Lundby et al.

It is certified that error appears in the above-identified patent and that said Letters Patent is hereby corrected as shown below:

<u>Title page,</u>
Item [75], Inventors, please change the last name of the first named inventor "Lunby" to -- Lundby --.

Signed and Sealed this

Twenty-sixth Day of November, 2002

Attest:

Attesting Officer

JAMES E. ROGAN
*Director of the United States Patent and Trademark Office*